April 15, 1941.    A. M. WOLF    2,238,615
MOTOR VEHICLE DRIVING MECHANISM
Original Filed April 9, 1936    2 Sheets-Sheet 1
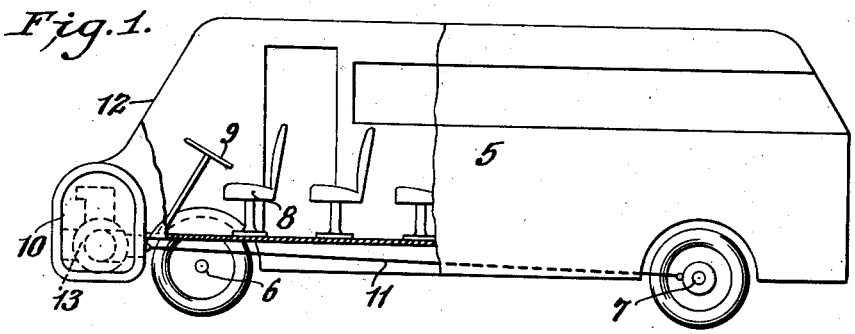
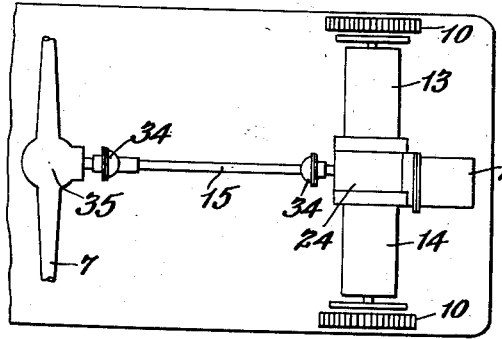
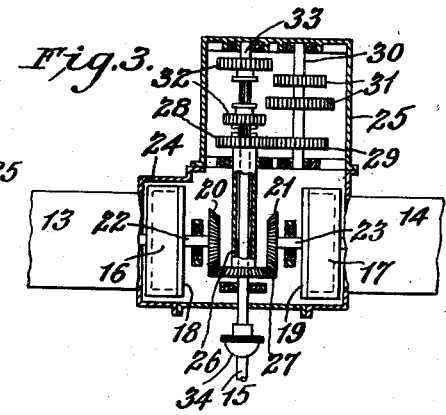
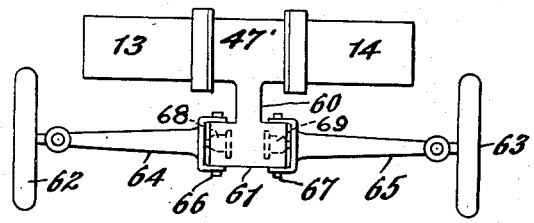
INVENTOR.
Austin M. Wolf,
BY M. C. Giddans
ATTORNEY.

April 15, 1941.  A. M. WOLF  2,238,615
MOTOR VEHICLE DRIVING MECHANISM
Original Filed April 9, 1936  2 Sheets-Sheet 2
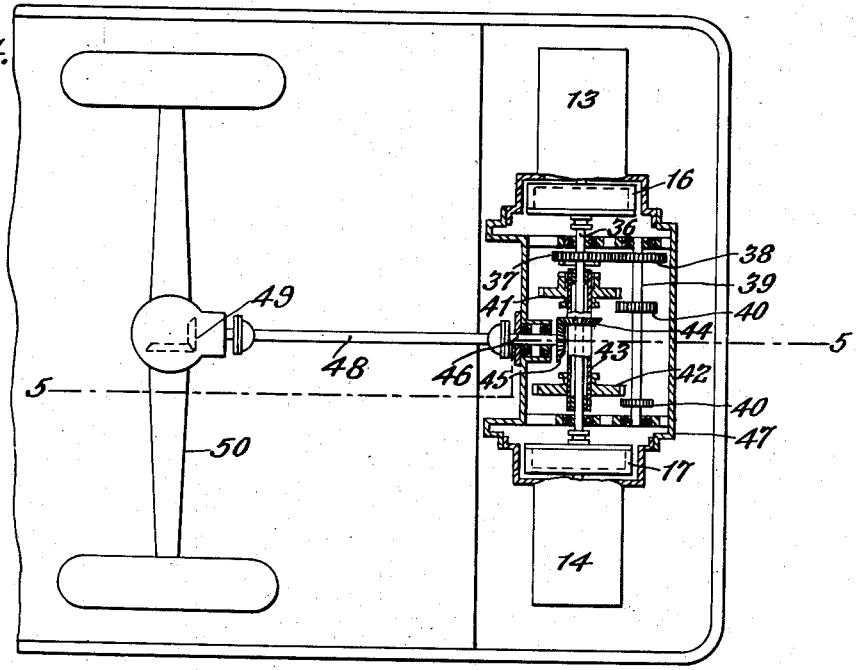
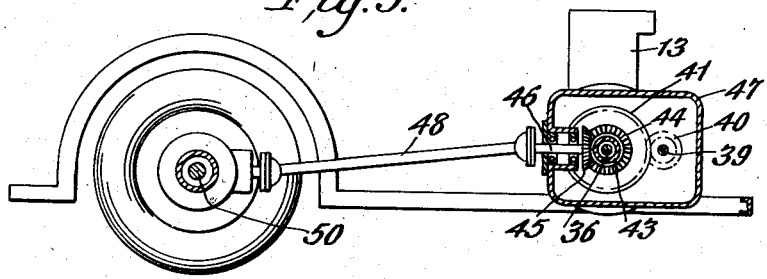
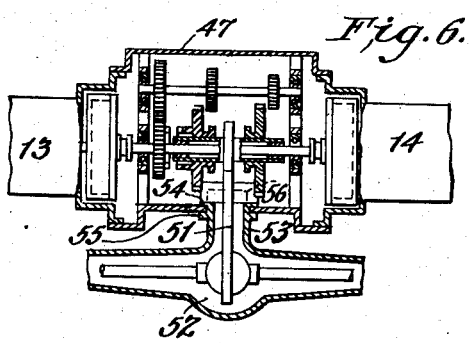
INVENTOR.
Austin M. Wolf,
BY M. C. Gyddane
ATTORNEY.

Patented Apr. 15, 1941

REISSUED
DEC 15 1942

2,238,615

UNITED STATES PATENT OFFICE 2,238,615

MOTOR VEHICLE DRIVING MECHANISM

Austin M. Wolf, Plainfield, N. J.

Original application April 9, 1936, Serial No. 73,584, which is a continuation of application Serial No. 612,057, May 18, 1932. Divided and this application August 1, 1939, Serial No. 287,704

8 Claims. (Cl. 180—54)

This invention relates to motor vehicle driving mechanism, the subject matter of the present application constituting a division of my pending application for patent Ser. No. 73,584 filed April 9, 1936, which in turn is a continuation of my original application Ser. No. 612,057 filed May 18, 1932.

Generically considered, it is the primary object and purpose of the present invention to provide a simply constructed and efficiently operating unitary power plant and variable speed transmission mechanism, embodying one or more engines or prime movers and which may be readily mounted in a minimum of space transversely of the vehicle frame or chassis and in closely spaced relation to one of the vehicle axles.

It is a more particular object of the invention, in one embodiment thereof, to provide in combination with differential axle drive mechanism and propelling means therefor, a power plant forming a part of the sprung weight of the vehicle and embodying an engine, clutch and clutch driven power transfer means arranged transversely of the vehicle, said power transfer means including power input and output shafts, one of which is tubular and surrounds the other in coinciding axial relation therewith, and means for transmitting power from the engine through said power transfer means to the differential embodying a power transmitting member fixed to said power output shaft.

In one embodiment of the invention, the engine is arranged transversely of the vehicle at one side of its center line and a variable speed transmission mechanism is mounted within a suitable housing rigidly connected with the inner end of the engine while the power transmitting clutch is interposed between said mechanism and the engine crank shaft. I further propose to provide such arrangement at the rear end of the vehicle in closely coupled relation with the differential drive mechanism for the rear axle and with said power transmission mechanism disposed at right angles to the engine crank shaft and in rearwardly projecting relation thereto, or in parallel relation with the crank shaft.

It is a further object of the invention to provide a dual engine power plant in which two transversely positioned engines are arranged in balanced relation at opposite sides of the propelling connection with the rear axle differential and in which a single variable speed transmission mechanism may be selectively coupled with the crank shafts of the respective engines by independently operable clutches interposed between said mechanism and the respective engines.

Other objects of my invention reside in the provision of independently mounted rear wheel axles with a unitary construction of the differential and transmission housings, or a closely coupled relatively movable connection between the differential and transmission housing.

With the above and other objects in view the invention consists in the improved motor vehicle driving mechanism, and in the form, construction and relative arrangement of its several parts as will hereinafter be more fully described, illustrated in the accompanying drawings and subsequently incorporated in the subjoined claims.

In the drawings wherein I have shown several simple and practical embodiments of the invention and in which similar reference characters designate corresponding parts throughout the several views:

Fig. 1 is a side elevation, partly in section, of a motor vehicle bus or coach showing the power plant mounted at the front end of the vehicle and having a driving connection with the rear axle differential mechanism.

Fig. 2 is a fragmentary bottom plan view showing the power plant mounted at the rear end of the vehicle in closely coupled relation with the differential drive for the rear axle.

Fig. 3 is a similar view of the power plant, the housing for the power transmission gearing being shown in section.

Fig. 4 is a view similar to Fig. 2 on an enlarged scale illustrating a modified construction.

Fig. 5 is a longitudinal section taken on the line 5—5 of Fig. 4.

Fig. 6 is a sectional view showing a unitary construction of the transmission and differential housing and a modified form of the propelling means, and Fig. 7 is an elevation illustrating the independently mounted rear wheel axles and another alternative unitary construction of the differential and transmission housing.

Referring in detail to the drawings, in Fig. 1 thereof I have shown the combined power plant and variable speed transmission unit as applied to a motor coach or bus, although it will be understood, as the description proceeds, that my invention is applicable as well to various other standard types of commercial and pleasure vehicles.

The body 5 of the vehicle is supported by any conventional suspension system upon the front and rear axles 6 and 7 respectively and at its front end is provided with the driver's seat 8 behind the steering wheel 9. The power plant comprises one or more engines positioned in advance of and in closely spaced relation to the front vehicle axle 6, said engine or engines being mounted in any approved manner transversely of the vehicle frame or chassis and constituting a part of the sprung weight of the vehicle. In Fig. 1 the combined engine and transmission unit is shown behind the radiator 10, the power output shaft of the transmission mechanism being connected by the propeller shaft, indicated at 11, with the differential drive mechanism of the rear axle 7. As herein shown, the front wall of the vehicle body 5 in which the usual windshield is provided, slopes downwardly, as at 12, and merges into the top wall of the engine compartment. This arrangement provides, in a vehicle of minimum over-all length, maximum passenger carrying capacity.

For the operation of trucks, buses and other relatively heavy commercial vehicles, I prefer to use two standard engines of normal size in the power plant to obtain the required power output, instead of a single engine of abnormally large cylinder size. Furthermore such small engines are readily obtainable at comparatively low cost and also due to the use of a greater number of small cylinders a more uniform power flow would be obtained.

As shown in Figs. 2 and 3, the pair of engines 13 and 14 are positioned transversely of the vehicle body with their crank shaft axes in alignment. In Fig. 2 of the drawings I have shown the alternative arrangement of the power plant in rearwardly spaced relation from the rear vehicle axle and extending across substantially the entire width of the vehicle. This arrangement permits of the use of a relatively short propeller shaft 15 or other equivalent driving connection between the power transmission mechanism and the differential drive of the rear axle.

Each of the engines 13 and 14 is provided with a flywheel 16, 17 at the inner end of its crank shaft with which suitable clutch means 18, 19 coacts to transmit power to the beveled gears 20, 21 fixed to the driven clutch shafts 22 and 23 respectively. The engine clutches and power transfer gearing is enclosed within the housing 24 which is rigidly fixed in any suitable manner to the opposed ends of the spaced engines 13 and 14 and is provided with a lateral extension 25 housing the variable speed transmission gearing to be presently described. As shown in Fig. 2 of the drawings, when the power plant is installed behind the rear axle of the vehicle, the transmission gearing with its housing 25 extends at right angles to the engine crank shafts and rearwardly thereof.

In the embodiment of the transmission gearing which I have selected for illustration, the same includes a tubular power input shaft 26 having the beveled gear 27 at one end thereof in constant mesh with gears 20 and 21. At its other end said tubular shaft 26 is also provided with the gear 28 in constant mesh with gear 29 fixed to one end of the countershaft 30. This shaft carries spaced gears 31 of different diameters for engagement by the shiftable variable speed gears 32 splined upon the power output shaft 33. This shaft extends through the tubular power input shaft 26 to rotate relative thereto and projects exteriorly of the housing 24. The propeller shaft 15 is connected by the usual flexible connections or universal joints indicated at 34, with the end of the shaft 33 and the driving member of the differential 35 of the rear wheel axle 7. When the combined power plant and transmission is mounted at the front end of the vehicle it will be understood that the transmission and its housing 25 projects forwardly within the engine compartment from the engines 13 and 14.

From the above description, it will be seen that I have provided a simple space conserving mounting and arrangement of the dual engine power plant and variable speed transmission, and in which power losses between the engine crank shaft and the final differential drive will be reduced to a minimum. Also by means of the independently operable clutches 18 and 19, the engines may be selectively coupled with the transmission unit and the vehicle driven by a single engine, should the other become disabled, or when carrying light loads. When the full power output of both engines is required the combined power output thereof is transmitted through said clutches to the single compactly arranged variable speed transmission mechanism.

In Figs. 4 and 5 of the drawings, I have illustrated an alternative arrangement of the variable speed transmission mechanism with respect to the engines, in which the power input and output shafts and the countershaft thereof have their axes disposed in parallel relation with the engine crank shafts. In this case, the engines, flywheels and clutches are provided as above described, but the power is transmitted from the clutches through a common power input shaft 36. Gear 37 fixed to the shaft near one of its ends is in constant mesh with a mating gear 38 on a countershaft 39. Additional gears of relatively different diameters, as indicated at 40, are also fixed to this countershaft to mesh with the sliding gears 41 and 42 respectively on the tubular power output shaft 43 which surrounds the power input shaft 36 in spaced relation thereto. A beveled gear 44 is fixed to the shaft 43 at its approximate center and is in constant mesh with the beveled pinion 45 on the shaft 46. This latter shaft is disposed on the longitudinal center line of the vehicle and is suitably mounted in one side of the housing 47 which encloses the above described transmission gearing and has end extensions, enclosing the flywheels 16—17, fixed to the inner ends of the respective engines 13 and 14. A longitudinally disposed propelling shaft 48 has universal joint connections at its opposite ends with the shaft 46 and the differential drive mechanism 49 of the rear vehicle driving axle 50.

It will be understood from the above description that the countershaft 39 constitutes an intermediate power output shaft between the input shaft 36 and the final power output shaft 43, all of said shafts being disposed in parallel relation with the axis of the engine crank shaft.

In Fig. 6 of the drawings I have illustrated an alternative of the propelling means shown in Fig. 4, in which said propelling connection between the power output shaft and the differential is in the form of an endless sprocket chain 51. It will, however, be understood that if desired a gear train or other well-known equivalent power transmitting connection between the transmission and differential may be employed. In this case, the differential and sprocket chain are enclosed within a housing 52 having a neck extension 53 projecting rearwardly therefrom and provided with spaced flanges 54 and 55 respectively having sliding bearing engagement with inner and outer finished surfaces of the wall of the transmission housing 47. This housing wall is provided with a vertically extending slot 56 which permits the differential and transmission housings to have relative vertical sliding movement in curved path concentric with the engine crank shafts. The flanges 54 and 55 provide an oil tight joint between the two housing sections. This arrangement in effect provides a unitary housing structure for the transmission and differential which is secured to and supported by the inner ends of the engines or motors 13 and 14.

In the drawings I have shown the power plant and vehicle drive mechanism mounted in rearwardly spaced relation from the rear vehicle axle. It will, however, be apparent that the power plant might be mounted in advance of said axle, or may be similarly arranged with relation to the front vehicle axle with the conventional driving connections to the differential of the rear axle. Also, where space conditions permit, the transversely distributed motor or engine and driving units may be mounted directly above the rear vehicle axle, in which case, of course, the propelling connection between the transmission and the differential will be vertically positioned instead of horizontally as shown in the drawing.

In Fig. 7 of the drawings I show another modification in which the transmission housing 47' fixed to the inner ends of the spaced engines has an integral extension 60 which is also formed integral with the housing 61 for the final differential drive mechanism. In this case therefore, wheels 62, 63 are mounted on independent axles 64, 65 respectively. These axles at their inner ends are pivotally mounted on the differential housing, the pivot connections 66 and 67 respectively being located on the center lines of the universal joints 68, 69 which convey power from the differential to the respective wheels through the axles 64, 65. This arrangement allows for the relative vertical movement of said axles and the wheels 62 and 63.

While I have above described and illustrated in the accompanying drawings several concrete examples of practical embodiments of the invention, it is nevertheless to be understood that in each of the disclosed constructions, the combination construction and relative arrangement of the various elements are susceptible of more or less modification. Accordingly this invention is not to be limited in these particulars, since it may also be exemplified in various other alternative structural forms not herein specifically disclosed, but which may be fairly comprehended as within the spirit and scope of the appended claims.

I claim:

1. Motor vehicle driving means including a pair of engines transversely positioned in spaced apart relation in the vehicle frame and arranged in spaced relation to the differential axle drive mechanism, a variable speed transmission mechanism including a power input shaft, housing means therefor interposed between and rigidly connected with the inner ends of said engines, independently operable clutches in coaxial relation with said power input shaft for selectively coupling the opposite ends of said shaft with the respective engine crank shafts, and propelling means connecting said transmission mechanism with the differential drive mechanism.

2. Motor vehicle driving means including the rear axle differential mechanism, an engine mounted in a transverse position in the vehicle frame and rearwardly spaced from said differential mechanism, variable speed transmission mechanism and housing means therefor rigidly mounted on one end of the engine and in longitudinal alignment with the differential mechanism, said transmission mechanism being axially disposed at right angles to the engine crank shaft and extending rearwardly therefrom, clutch means for drive connecting the engine crank shaft with said transmission mechanism, and propelling means between the transmission mechanism and the differential drive mechanism.

3. Motor vehicle driving means including rear axle differential drive mechanism, an engine transversely positioned in the vehicle frame in rearwardly spaced relation from the differential mechanism, variable speed transmission means and a clutch for drive connecting the same with the engine crank shaft, housing means for said transmission means and clutch rigidly fixed to one end of the engine, said transmission means comprising power input and output shafts axially disposed at right angles to the engine crank shaft and extending rearwardly therefrom, and a propeller shaft operatively connecting said power output shaft with the differential drive means.

4. In a motor vehicle, a pair of transversely positioned engines, spaced apart on opposite sides of the vehicle center line, variable speed mechanism arranged between said engines and in substantially parallel relation to one of the vehicle axles, and clutch means for selectively connecting said variable speed mechanism with the respective engines, said mechanism including power output and input shafts in axial alignment with the engine crank shafts, one of said shafts being tubular and surrounding the other in spaced relation thereto, and means for transmitting power from the output shaft to the vehicle axle.

5. Motor vehicle driving means including an engine mounted in a transverse position in the vehicle frame at one side of the longitudinal center line thereof, differential drive mechanism longitudinally spaced from the engine at the center line of the vehicle frame, and means for transmitting power from said engine to the differential drive mechanism, comprising a power input shaft and clutch drive connected in axial alignment with the engine crank shaft, a tubular shaft surrounding and spaced from said input shaft and drive connected at one of its ends therewith, means operatively connecting said tubular shaft with said differential drive mechanism, and a transmission and differential housing secured to the inner end of said engine and positioned in the longitudinal center line of the vehicle frame.

6. In a motor vehicle construction, a transversely disposed power plant occupying substantially the entire width of the vehicle and including an engine and a clutch arranged in transverse succession, a power transmitting unit including in longitudinal succession, a differential axle drive mechanism and a change speed mechanism, power transmission means between the clutch and change speed mechanism, and propelling means connecting the change speed mechanism with the differential drive mechanism.

7. In a motor vehicle, a body, a pair of transversely spaced supporting wheels for said body and transverse drive axles for the wheels, a power transmitting unit associated with the axles including, in longitudinal succession, differential mechanism connecting the drive axles and variable speed mechanism, a power plant unit including an engine and a clutch disposed transversely of the vehicle body, housings for the differential mechanism and the variable speed mechanism, one of said housings having a lateral extension directly connected with the other housing, propelling means connecting the differential mechanism with the variable speed mechanism and extending through said housing extension, and means operatively connecting the engine clutch with the variable speed mechanism.

8. Motor vehicle driving means including an engine mounted in a transverse position in the vehicle frame at one side of the longitudinal center line thereof, differential drive mechanism longitudinally spaced from the engine, and means for transmitting power from said engine to the differential drive mechanism comprising a power input shaft, a clutch drive connecting said input shaft with the engine crank shaft, a tubular shaft surrounding and spaced from said input shaft and drive connected at one of its ends therewith, means operatively connecting said tubular shaft with said differential drive mechanism, and a transmission and differential housing secured to the inner end of said engine.

AUSTIN M. WOLF.